Patented Feb. 9, 1954

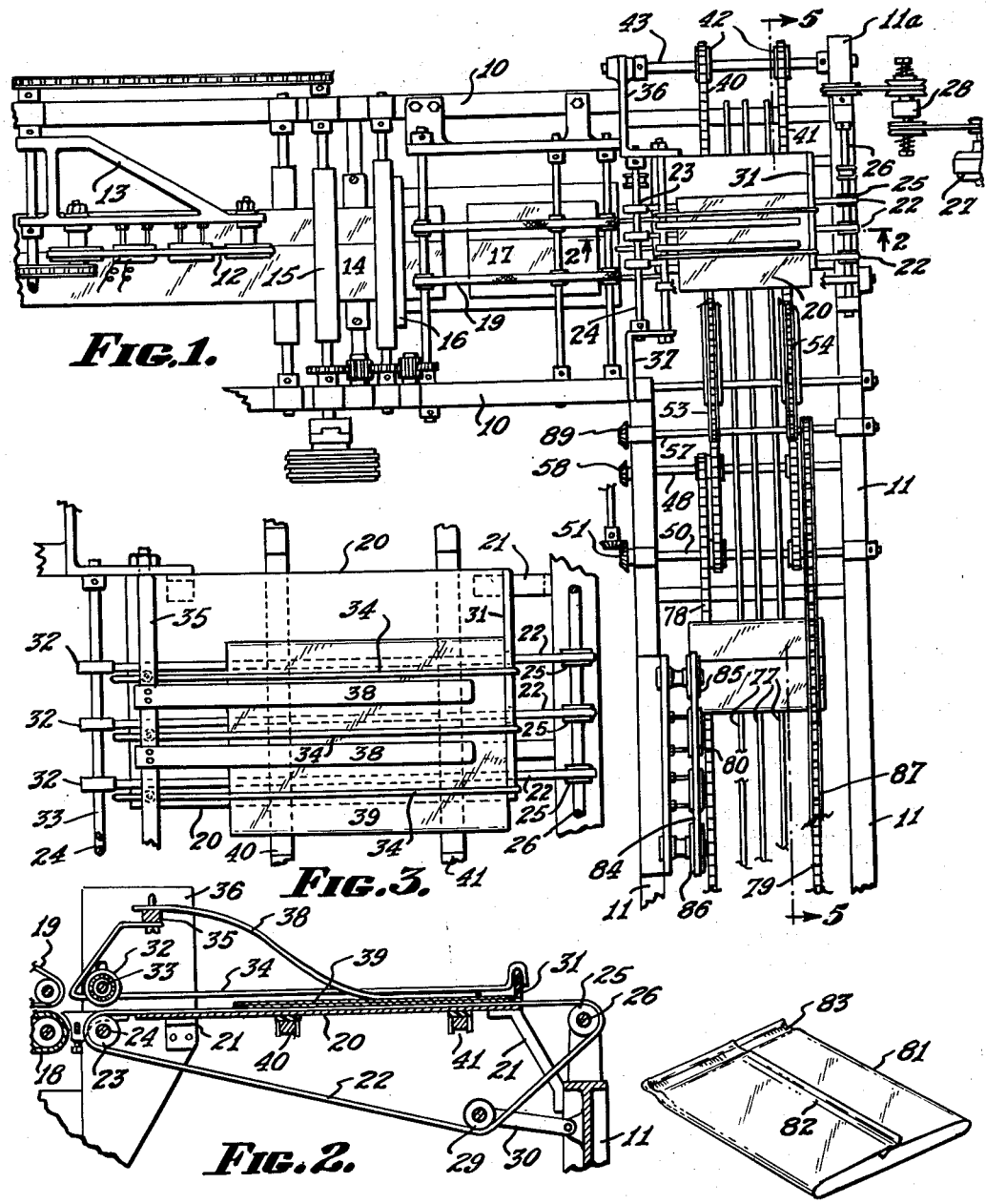

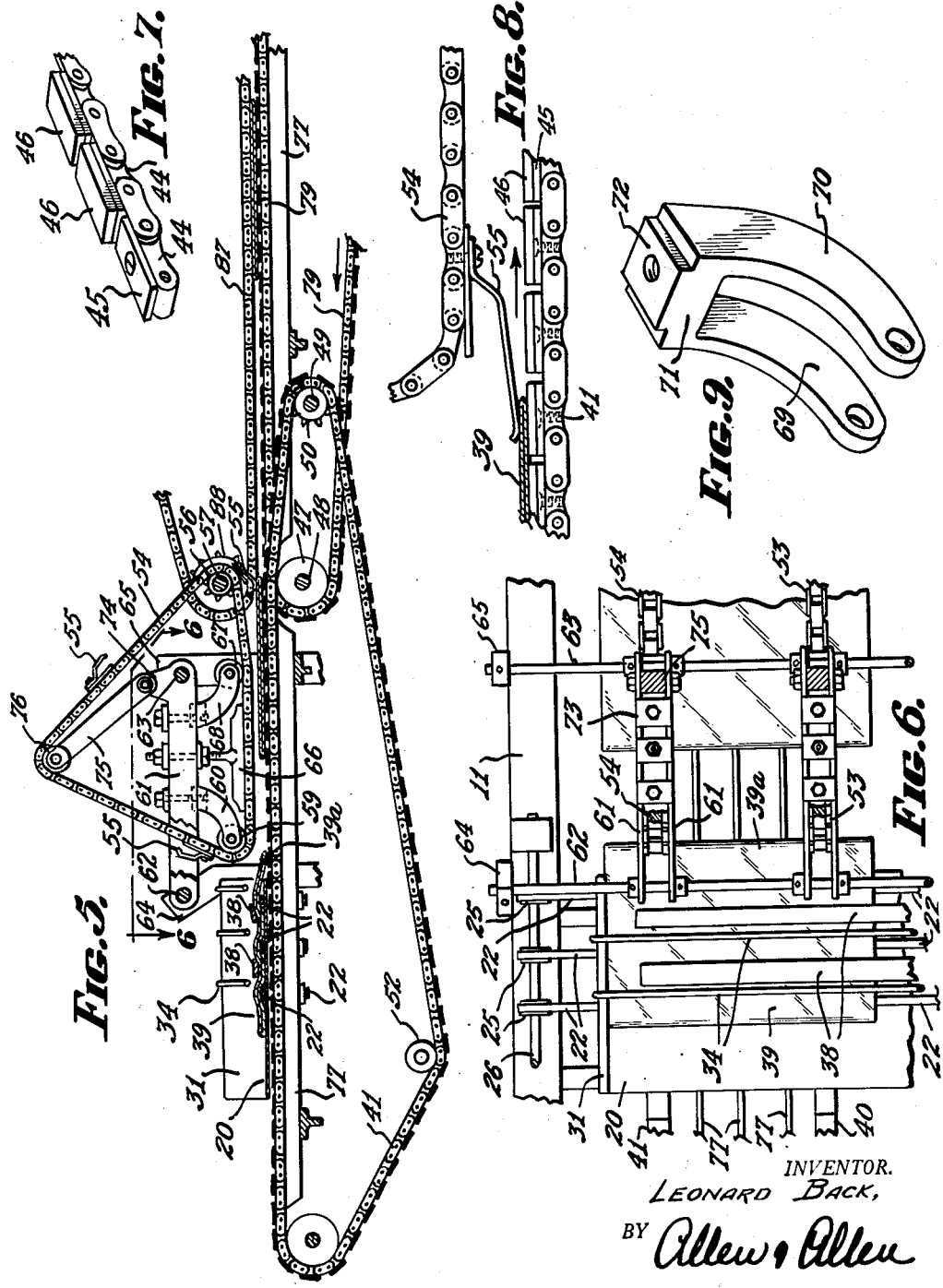

2,668,708

UNITED STATES PATENT OFFICE 2,668,708

TRANSFER MECHANISM FOR SEALING MEANS

Leonard Back, Middletown, Ohio, assignor to The Interstate Folding Box Company, Middletown, Ohio, a corporation of Ohio Application April 28, 1950, Serial No. 158,796

15 Claims. (Cl. 271—49)

My invention relates generally to bag making machines of the type wherein a continuous length of material is tubed about a former with a longitudinal seam; the bag tube thus formed is cut into bag lengths; and the bag lengths are transferred to a second machine section at an angle to the first, wherein the bag lengths are closed on one end to form bags. More particularly, my invention pertains to bag machines of this type wherein the material of which the bag structures are made is a relatively thin and flimsy film of amorphous substance, difficult to heat seal. Reference is made to the copending application of Walter Haas and Frank D. Bergstein, Serial No. 149,708, filed March 15, 1950, entitled Method and Means for Heat-Sealing Films, in which means are described for the heat sealing of longitudinal seams and transverse bottom seams in bags and bag tubes formed of polyethylene or other film of similar characteristics. The teachings of the present invention are applicable to machines of the general type set forth in the said copending application and, in the practice of my invention, I employ the heat sealing means therein described and claimed.

Particular problems in such machines arise in the handling of the bag length structures, in their accurate transfer from the first section of the machine to the second angularly related section, and in the transport of the bag lengths through the heat sealing means which is employed in the second machine section to form the transverse end seam. These difficulties arise in large part from the extremely flexible and flimsy character of the heat sealable films and structures made therefrom; and they are exaggerated in proportion to the relative size of such structures. In particular, it is difficult to move and to change the direction of motion of such structures through machine sections without permitting cocking, misalignment, distortion and folding. It is likewise difficult to carry the bag tubes through end sealing means, to cause their proper entry thereinto, and to avoid distortion, cocking and folding, all of which would interfere with the proper production of end seals.

Accordingly, it is an object of my invention to provide improved means for handling flimsy bag tubes while maintaining their alignment with machine elements, especially during and subsequent to changes in their direction of motion.

It is an object of my invention to provide improved means of aligning bag tubes and similar structures especially of flimsy material, with machine elements exclusive both of guides and of means for conveying the structures.

It is an object of my invention to provide improved means for moving flimsy bag tubes in a direction normal to their major or longitudinal axes and for conveying them through end sealing equipment of the delicate type required for the interfusion of superposed parts of films having extremely narrow ranges of temperature for interfusion without loss of integrity.

These and the more specific objects of my invention, which will be pointed out hereinafter or will be apparent to one skilled in the art upon reading these specifications, I accomplish by that structure and arrangement of parts of which I shall now describe and exemplary embodiment. Reference is made to the accompanying drawings wherein:

Figure 1 is a partial plan view of a machine embodying my invention.

Figure 2 is a partial vertical section of the transfer portion of the apparatus taken along the section line 2—2 of Figure 1.

Figure 3 is an enlarged plan view of the transfer section.

Figure 4 is a perspective view of a bag having a longitudinal and a transverse seam, as produced on my machine.

Figure 5 is a longitudinal vertical section of a portion of the second machine section inclusive of the transfer apparatus but not of the second section sealing means.

Figure 6 is a partial plan view of the transfer apparatus showing a bag tube in process of being transferred.

Figure 7 is a perspective view of a portion of a chain element showing grippers.

Figure 8 is a partial elevational view showing apparatus for engaging and removing bag tubes from the transfer platform.

Figure 9 is a perspective view of a fork element employed for chain positioning.

In Figure 1 I have shown angularly related machine portions respectively having frame elements 10 and 11. In the first section of the machine the bag forming material is tubed about a former (not shown), with the formation of a longitudinal seam by means of a welding apparatus generally indicated at 12 and mounted upon a movable frame 13. The former, opposite the welding device, has means providing a movable support for the parts being joined. The welding apparatus is described in the copending application referred to above and does not require description at this point. The bag tube 14, formed as above set forth, is drawn forwardly by driven pinch rolls, the upper one of which is shown at 15. A fly knife apparatus 16 or other suitable cutter severs the bag tube 14 into bag lengths 17. These are propelled forwardly in the first section of the machine by lower and upper belts 18 and 19 forming a gripping combination (the lower belts being shown in Figure 2), or by any other suitable conveying means toward and into the transfer section of the machine. It is an advantage of my mechanism that no guiding is required at this point, the bag tubes, in spite of their flimsy nature, being aligned in the transfer section of the machine by means which will next be described.

In the transfer section I provide a metal plate or platform 20 mounted upon suitable brackets 21 in the frame 11 and preferably adjustable longitudinally of the second machine section. A series of endless rubber belts 22 in spaced relationship are so mounted that their upper flights traverse and lie just above the metal plate 20. The belts are mounted upon sheaves 23 adjustable on the shaft 24 at one end, and at the other on sheaves 25 adjustable on a shaft 26. Driving power is applied to the shaft 26. This power may be obtained from a shaft on the machine driven by the main prime mover of the machine (not shown); but it is convenient and advantageous to provide for the purpose a separate small motor 27 driving the shaft 26 through transmission means 28 which are preferably adjustable as to speed. The several belts 22 may have in their lower flights individual tensioning means of any effective type. In Figure 2 I have shown tensioning means for a belt 22 comprising a sheave 29 mounted upon an arm 30 which is pivoted to the frame 11, the arm and sheave acting through their combined weight to tension the belt.

At the rear end of the plate 20, I provide a stop or aligning rail 31 which also is preferably adjustable. At the entrance end of the transfer mechanism, if desired, small ball bearing rolls 32 may be mounted adjustably on a shaft 33 (see Figure 2) so that they may be brought over the respective sheaves 23 to coact with the belts and provide a clamping action at this point to start the bag tubes more positively into the transfer mechanism. A series of wire hold-downs 34 may be located above the plate and preferably out of contact with the bag tubes. These wire hold-downs may be mounted at one end, as shown in Figure 2, upon the guide or backstop 31. At the other end they may conveniently be mounted on a rail 35 extending transversely of the first section of the machine and mounted upon suitable brackets 36 and 37.

The bag tubes are delivered from the first section of the machine by the belts 18 and 19 to the belts 22 by which they are moved across the plate 20 and aligned against the backstop or guide 31. The flimsy nature of the bags permits them to sag between the belts 22 and come against the plate 20 which, therefore, forms a major support for each bag tube aligned against the backstop. The support thus furnished the bag tubes permits them to be aligned against the backstop while the belts 22, which are small in both transverse directions, slide beneath the bag tubes. The frictional engagement of larger areas of the bag tubes against the plate 20 overcomes the frictional drag of the belts after the bag tubes are brought to rest. In order to reinforce this action and to prevent wrinkling and distortion of the bags, I prefer to provide additional hold-down means of small mass resting against the upper surfaces of the bag tubes between the belts 22 and acting to press the bag tubes down against the plate 20 with a force so light as not to interfere with the positioning of the bag tubes on the plate by means of the belts 22. A convenient way of doing this is to attach strips of flexible material 38 to the overhead rail 35, as most clearly shown in Figures 2 and 3. These strips sag under their own weight and outer end portions of them come to rest upon the bag tube 39. The strips may be made of any flexible material such as cloth, leather or rubber; but I have found that ordinary paper is an excellent material to use since the effective weight of each strip may then readily be adjusted by varying the number of plies of paper making up each strip. Where adjustment is attained in this manner, the plies will ordinarily not be in adhesive union so that a plural-ply strip will retain the maximum flexibility. I have found by these means that extremely flimsy bag tubes of polyethylene or similar substance may be moved in a controlled manner over the plate 20 by the rubber belts 22 and positioned and aligned against the backstop 31, and that they will maintain their aligned positions without cocking, wrinkling or distortion until moved in the transverse direction, in spite of the drag of the belts 22 which thus may be continuously driven by the motor 27.

In the second section of the machine, I mount a pair of first conveyor chains 40 and 41. These pass over sheaves 42 mounted on a shaft 43 at the rear of the second section of the machine, the shaft being journaled at one end in the bracket 36 and at the other in an extension 11a of the frame 11. The upper flight of the chains 40 and 41 lies wholly beneath the plate 20 and out of contact therewith.

The chains are preferably of the form shown in Figure 7 where the solid link members 44 are provided with plates 45 on their outer sides, which metal plates are somewhat longer than the link members themselves so that in a straight flight of the chains, the ends of the plates are closely juxtaposed. The plates are then covered individually with pieces 46 of a frictional substance such as leather or rubber by cementing. The pieces may thus be renewed as they wear.

At their forward ends in the second machine section, the chains 40 and 41 are deflected slightly over sheaves 47 mounted upon a shaft 48; and they return over sheaves 49 mounted upon a shaft 50. This shaft is driven as by bevel gearing 51, and suitable shaft connections, from a timed moving part of the machine. The chains 40 and 41 may have tighteners in their lower flights, as indicated at 52 in Figure 5.

The plate 20 is so located that the forward edge of the bag tube overhangs it, as at 39a in Figures 5 and 6. Thus the leading edge of the bag tube 39, as respects the second section of the machine, sags downwardly off the edge of the plate coming into contact with the upper surfaces of the frictional pads 46 on the chains 40 and 41. The engagement of the bag tube with the plate 20 and the frictional hold-down strips 38 is such, however, as to resist any frictional drag of the chains 40 and 41 upon the free sagging edge 39a of the bag tubes. If the overhanging edge of a bag tube is pressed against the frictional pads 46 of the chains, however, the chains will then move the bag tubes transversely of their former direction of motion and start them moving longitudinally of the second machine section. This action is accomplished through the provision of overhead chain elements 53 and 54, the disposition of which is most clearly shown in Figure 5, which overhead chains carry flexible engagement fingers 55 at suitable intervals and are driven in timed relationship to the chains 40 and 41. Forwardly of the second machine section, the chains 53 and 54 pass over sheaves 56 on a shaft 57 journaled in the frame elements 11 and driven as by a bevel gear 58 (Figure 1). Rearwardly the position of the lower flight of the chains 53 and 54 is determined by sheave elements 59 mounted in forks 60 on bar elements 61 extending longitudinally of the machine section. The bar elements may be mounted on rods 62 and 63 extending across the machine section and in turn mounted on brackets 64 and 65 on the machine frame. The lower flight of the chains 53 and 54 is, for the greater part of its length, maintained in parallelism respectively with the chains 40 and 41 by the sheaves 59, overhead track means 66 also mounted on the bar element 61, and sheaves 67 journaled in forks 68 on the bar elements. Beyond the sheaves 67 the chains 53 and 54 diverge slightly from the chains 40 and 41, as shown in Figure 5.

A preferred form of fork is illustrated in Figure 9 as comprising tine portions 69 and 70 and a head portion 71 which has an upstanding locating part 72 of reduced lateral dimension. It will be understood especially from Figure 6 that the bar elements 61 are double and lie in interspaced relationship for each of the chains 53 and 54, the downward flights of these chains actually passing between the bar elements for each chain. The locating abutment 72 for each fork extends upwardly between a pair of the bar elements so that the fork is held non-rotatively; and the forks are held to the bar elements by bolts engaging each fork head, and passing through plates 73 lying above the bars. The bar elements 61 are provided with ears 74 to which is pivoted an arm 75 bearing at its bifurcated upper end a tightening and guiding sheave 76 for each of the chains 53 and 54.

It will be understood from Figures 5 and 8 how the resilient fingers 55 act at suitable intervals to press the free sagging edges 39a of the bag tubes 39 against the friction pads on the chains 40 and 41, thus causing the chains to move the bag tubes longitudinally of the second machine section. The fingers 55 maintain contact with the bag tubes until the bag tubes have been entirely transferred from the plate 20 and its attendant mechanisms to the chains 40 and 41, after which the fingers return around the sheaves 56. To prevent sagging of the bag tubes between the chains 40 and 41, I provide a series of supporting bars 77 between the chains 40 and 41; and these bars may be continued either individually or by means of extensions throughout the second section of the machine.

In the particular embodiment the bag tube being moved by the chains 40 and 41 is transferred in the second machine section to a pair of chains 78 and 79 forming another conveyor. These chains are preferably of the type described in connection with Figure 7. In the rearward direction they return over sprockets on the shaft 48, and may be driven thereby. By means of the chains 78 and 79, the bag tubes are carried through an end seaming or welding mechanism indicated generally at 80 in Figure 1. The purpose is to form a bag, as illustrated at 81 in Figure 4, which bag has a longitudinal seam 82 welded in the first section of the machine and a bottom closure seam 83 welded in the second machine section. The precise form of the welding device is not a limitation upon the broader aspects of my invention. Preferably it is a welding device such as those described and claimed in the copending application referred to above. Desirably this comprises an upper metal belt 84 passing over sheaves 85 and 86, one of which is driven in timed relationship to the chains 78 and 79. The upper surfaces of the ends of the bag tubes are presented to the lower surface of the metal belt 84 in its lower flight, and held thereagainst by suitable moving supporting means. These may be a similar belt with supports mounted beneath the belt 84; but preferably I employ small rubber covered low friction rollers to hold the bag tube end upwardly against the flight of the belt. Heat is applied to the film material of the bag tube end in various ways through the belt 84, but preferably by means of a gas flame issuing from a torch directed against the upper surface of the belt in its lower flight through a water cooled shielding means which confines the impingement of the flame to a central longitudinal portion of the belt spaced from its edges. Following the heating means in the direction of motion of the bag tubes, I apply cooling means to the belt.

I have found in particular that I can control the movement of the bag tubes through the second section of the machine and the entry of their ends into the welding or heat sealing apparatus by supporting the bag tubes upon the conveyor chains 78 and 79, as shown and described, and by clamping the bag tubes only with respect to the chain 79 which is the chain remote from the welding means 80. Thus at the time of actual end welding, the bag tube is clamped only at positions adjacent its ends, i. e. at the chain 79 at one end and by the driven welding means at the other; but an intermediate portion of the bag tube is supported by the chain 78 and the rods 77. I have found that this is important in the controlled movement of flimsy bag tubes through end welding means; and the particular arrangement shown enables me to move the bag tubes and introduce them into the welding apparatus without distortion, cocking, folding and the like, so that the end seams are formed in a dependable manner and show no tendency to run off the end edges of the bag tubes.

For clamping the bag tubes against the chain 79, I provide an overhead chain 87 preferably of the type described in connection with Figure 7. This chain is provided with a sprocket 88 on the shaft 57. This shaft will be driven in timed relationship to the other moving parts of the machine as through a bevel gear 89. It will be understood that the chains 78, 79 and 87 will return over suitable sprockets at the forward end of the second section of the machine (not illustrated), at which end there may also be delivery and stacking means.

While I have shown two sets of main chains in the second section of the machine, it will be understood by the skilled worker in the art that a single set of chains may be carried entirely through the second section. The overhead chains 53 and 54 which carry the depressing fingers 55 turn over sheaves 59 at the rear ends of their horizontal flights, which sheaves are of small diameter, producing a very rapid gripping action on the overhanging edge 39a of the bag tubes against the lower conveyor chains 40 and 41. Also, it will be noted that the overhead chains diverge from the chains 40, 41 near the forward ends of their horizontal flights so that the gripping pressure is gradually lessened before being relieved entirely.

While I have shown the bag tubes as being moved first on the chains 40, 41 under the influence of the depressing and gripping fingers 55 and afterward being moved on chains 78 and 79, the latter having an overhead gripping chain 87, it is within the scope of my invention not only as set forth above to extend the chains 40 and 41 throughout the second machine section, thus eliminating the chains 78 and 79, but also to extend one or both of the chains 53 and 54 throughout or substantially throughout the second machine section, so that the bag tubes will travel through the section including their passage through the end sealing means, while resting upon the lower chains of the conveyor and the intermediate rods 77 but with their forward edge portions only gripped against one or both of the said lower chains.

Further modifications may be made in my invention without departing from the spirit of it. Having thus described my invention in certain exemplary embodiments, what I claim as new and desire to secure by Letters Patent is:

1. Transfer mechanism for limp, flexible articles in a multi-section machine having angularly related sections comprising a platform at the start of the second section, conveyor means for moving an article onto and across said platform with an edge of the article extending beyond the edge of the platform nearest the second section, abutment means for stopping the article on the platform, a second conveyor having a frictional surface traveling beneath said platform in a direction angularly related to the direction of movement of the first mentioned conveyor means, and periodically acting depressing means traveling with the second conveyor in timed relation thereto for engaging the extending edge of the article and bringing it into frictional relationship with the frictional surface of said second mentioned conveyor whereby said second mentioned conveyor is caused to remove said article from the platform and carry it in a new direction of motion.

2. The structure claimed in claim 1 wherein said depressing means is a finger attached to an element moving with said second mentioned conveyor a sufficient distance to cause said conveyor to remove said article from the platform.

3. The structure claimed in claim 2 wherein said first mentioned conveyor means includes narrow, thin, spaced belts having portions traveling over the surface of said platform, said spaced belts extending beyond said abutment means.

4. The structure claimed in claim 2 wherein said first mentioned conveyor means includes narrow, thin, spaced belts having portions traveling over the surface of said platform, in a continuous manner, said article having sufficient limpness to sag into contact with said platform between said belts whereby the frictional engagement of the article against the platform in the areas between the belts will overcome the frictional drag of the belts thereby maintaining a stationary position of said article on said platform in spite of continued movement of said belts.

5. The structure claimed in claim 2 wherein said first mentioned conveyor means includes narrow, thin, spaced belts having portions traveling over the surface of said platform, in a continuous manner, said article having sufficient limpness to sag into contact with said platform between said belts whereby the frictional engagement of the article against the platform in the areas between the belts will overcome the frictional drag of the belts thereby maintaining a stationary position of said article on said platform in spite of continued movement of said belts, and flexible means engaging said limp article between said belts to press it into contact with said platform.

6. The structure claimed in claim 2 wherein said first mentioned conveyor means includes narrow, thin, spaced belts having portions traveling over the surface of said platform, in a continuous manner, said article having sufficient limpness to sag into contact with said platform between said belts whereby the frictional engagement of the article against the platform in the areas between the belts will overcome the frictional drag of the belts thereby maintaining a stationary position of said article on said platform in spite of continued movement of said belts, and flexible means engaging said limp article between said belts to press it into contact with said platform, said last mentioned means comprising strips of flexible material anchored at one end above the level of said limp article and resting on said article by gravity.

7. Transfer mechanism for limp, flexible articles in a multi-section machine having angularly related sections, comprising a platform at the start of the second section, conveyor means for moving an article onto and across said platform with an edge of the article extending beyond an edge of the platform, abutment means for stopping the article on the platform, a second conveyor having a frictional surface traveling beneath said platform in a direction angularly related to the direction of movement of the first mentioned conveyor means, and periodically acting depressing means for engaging the extending edge of the article and bringing it into frictional relationship with the frictional surface of said second mentioned conveyor, said depressing means comprising a finger attached to an element moving with said second mentioned conveyor a distance sufficient to cause said conveyor to remove said article from the platform, said first mentioned conveyor means including narrow, thin, spaced belts having portions traveling over the surface of said platform, in a continuous manner, said article having sufficient limpness to sag into contact with said platform between said belts, flexible means engaging said limp article between said belts to press it into contact with said platform, said last mentioned means comprising strips of flexible material anchored at one end above the level of said limp article and resting on said article by gravity, said second mentioned conveyor comprising a pair of traveling chains, the links of which have upwardly disposed frictional facings and in which the element moving with said second mentioned conveyor comprises driving chains mounted respectively above the first mentioned chains and having a flight in substantial parallelism with the upper flight of the first mentioned chains, said fingers being spring fingers attached to said second mentioned chains.

8. Transfer mechanism for limp, flexible articles in a multi-section machine having angularly related sections, comprising a platform at the start of the second section, conveyor means for moving an article onto and across said platform with an edge of the article extending beyond the edge of the platform, abutment means for stopping the article on the platform, a second conveyor having a frictional surface traveling beneath said platform in a direction angularly related to the direction of movement of the first mentioned conveyor means, and periodically acting depressing means for engaging the extending edge of the article and bringing it into frictional relationship with the frictional surface of said second mentioned conveyor, said depressing means comprising a finger atached to an element moving with said second mentioned conveyor a distance sufficient to cause said conveyor to remove said article from the platform, said first mentioned conveyor means including narrow, thin, spaced belts having portions traveling over the surface of said platform, in a continuous manner, said article having sufficient limpness to sag into contact with said platform between said belts, flexible means engaging said limp article between said belts to press it into contact with said platform, said last mentioned means comprising strips of flexible material anchored at one end above the level of said limp article and resting on said article by gravity, said second mentioned conveyor comprising a pair of traveling chains, the links of which have upwardly disposed frictional facings and in which the element moving with said second mentioned conveyor comprises driving chains mounted respectively above the first mentioned chains and having a flight in substantil parallelism with the upper flight of the first mentioned chains, said fingers being spring fingers attached to said second mentioned chains, said overhead chains turning over small diameter sprockets at the point where said fingers begin to exert their gripping action whereby said gripping action is made very rapid, and wherein said overhead chains diverge from the chains of said last mentioned conveyor toward the forward end of said second machine section whereby gradually to release said gripping action.

9. Transfer mechanism for limp, flexible articles in a multi-section machine having angularly related sections, comprising a support at the start of the second section, conveyor means for moving an article onto and across said support with a side edge of the article extending beyond the edge of the support, abutment means for stopping of the article on the support, a second conveyor having a frictional surface traveling beneath said support and beneath said extending edge of the article in a direction angularly related to the direction of movement of the first mentioned conveyor means, periodically acting depressing means traveling with the second conveyor in timed relation thereto for engaging the extending edge of the article and bringing it into frictional relationship with the frictional surface of said second mentioned conveyor, said second mentioned conveyor comprising a pair of traveling chains, the links of which have upwardly disposed frictional facing, said depressing means including driven chains mounted respectively above the first mentioned chains and having a flight in substantial parallelism with the upper flight of said first mentioned chains, whereby said second mentioned conveyor is caused to remove said article from the platform and carry it in a new direction of motion.

10. Transfer mechanism for limp, flexible articles in a multi-section machine having angularly related sections, comprising a support at the start of the second section, conveyor means for moving an article onto and across said support with a side edge of the article extending beyond the edge of the support, abutment means for stopping the article on the support, a second conveyor having a frictional surface traveling beneath said support and beneath said extending edge of the article in a direction angularly related to the direction of movement of the first mentioned conveyor means, periodically acting depressing means traveling with the second conveyor in timed relation thereto for engaging the extending edge of the article and bringing it into frictional relationship with the frictional surface of said second mentioned conveyor, said second mentioned conveyor comprising a pair of traveling chains, the links of which have upwardly disposed frictional facing, said depressing means including driven chains mounted respectively above the first mentioned chains and having a flight in substantial parallelism with the upper flight of said first mentioned chains, whereby said second mentioned conveyor is caused to remove said article from the platform and carry it in a new direction of motion, said overhead chains turning over small diameter sprockets at the point where said depressing means begin to exert their gripping action, whereby said gripping action is made very rapid, said overhead chains diverging from the chains of said last mentioned conveyor toward the forward end of said second machine section whereby gradually to release the gripping action of said depressing means.

11. In transfer mechanism for limp, flexible articles in a multi-section machine having angularly related sections, means for moving a flexible article in a first direction against a stop, said means comprising a continuously driven conveyor having moving elements spaced transversely of the article in its direction of motion and of a restricted area in said direction, together with a fixed stop, so that said moving elements continuously urge said limp article against said stop, stationary supporting means immediately below said conveyor effective in the spaces between said moving elements to frictionally engage the limp article to overcome the frictional drag of the said moving elements, and flexible means engaging said limp article between said moving elements to press it into contact with said stationary supporting means, whereby to prevent buckling of the limp article in its direction of motion.

12. The structure claimed in claim 11 wherein said last mentioned flexible means comprises strips of flexible material anchored at one end above the level of said limp article and resting on said article by gravity.

13. In transfer mechanism for limp, flexible articles in a multi-section machine having angularly related sections, means for moving a limp article in a first direction and against a stop arresting movement of the limp article in the said first direction, gripping means moving transversely of said first mentioned moving means to engage the adjacent side edge of the article and move the article in said transverse direction with said side edge leading, said gripping means comprising a conveyor having a frictional surface traveling beneath the said first mentioned moving means, and periodically acting depressing means traveling with said conveyor in timed relation thereto for engaging the said side edge of the article and bringing it into frictional engagement with the frictional surface of said conveyor, whereby said conveyor is caused to remove said article from said first mentioned moving means and carry it in a new direction of motion.

14. The structure claimed in claim 13 wherein said depressing means comprises a spring finger attached to an element moving with said conveyor for a distance sufficient to cause said conveyor to remove the article from said first mentioned moving means.

15. The structure claimed in claim 14 wherein said conveyor comprises spaced apart moving chains, and wherein a depressing means is provided for contact with each of said chains, whereby the limp article is gripped at spaced points along the side edge thereof to prevent buckling.

LEONARD BACK.

References Cited in the file of this patent

UNITED STATES PATENTS

| Number | Name | Date |
|---|---|---|
| 366,758 | Brown | July 19, 1887 |
| 753,933 | Sturtevant | Mar. 8, 1904 |
| 1,302,571 | McAdams | May 6, 1919 |
| 1,628,225 | Bradshaw | May 10, 1927 |
| 1,836,213 | Werner | Dec. 15, 1931 |
| 1,987,352 | Tufts | Jan. 8, 1935 |
| 2,052,526 | Broadmeyer | Aug. 25, 1936 |
| 2,260,659 | Copeland | Oct. 28, 1941 |
| 2,262,303 | Staude | Nov. 11, 1941 |
| 2,315,646 | Novick | Apr. 6, 1943 |
| 2,379,361 | Bombard | June 26, 1945 |
| 2,451,648 | Anderson | Oct. 19, 1948 |
| 2,503,984 | Wuko | Apr. 11, 1950 |
| 2,547,470 | Janke | Apr. 3, 1951 |
| 2,559,235 | Tascher | July 3, 1951 |